United States Patent
Katooka et al.

(10) Patent No.: US 6,825,441 B2
(45) Date of Patent: Nov. 30, 2004

(54) POWER SUPPLY APPARATUS

(75) Inventors: Masao Katooka, Osaka (JP); Kenzo Danjo, Osaka (JP); Takeshi Morimoto, Osaka (JP); Hideo Ishii, Osaka (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 84 days.

(21) Appl. No.: 10/288,700

(22) Filed: Nov. 6, 2002

(65) Prior Publication Data
US 2003/0085254 A1 May 8, 2003

(30) Foreign Application Priority Data

Nov. 7, 2001 (JP) .................................. 2001-342343
Aug. 23, 2002 (JP) .................................. 2002-243134

(51) Int. Cl.⁷ .............................................. B23K 9/10
(52) U.S. Cl. .................... 219/130.1; 219/136; 361/616
(58) Field of Search .......................... 219/130.1, 132, 219/136; 361/616; D15/144.1

(56) References Cited

U.S. PATENT DOCUMENTS

| 3,477,005 | A | * | 11/1969 | Weems | ..................... 318/266 |
| 4,527,690 | A | | 7/1985 | Schmidts et al. | |
| 4,973,821 | A | * | 11/1990 | Martin | .................. 219/130.51 |
| 5,722,887 | A | | 3/1998 | Wolfson et al. | |
| 5,745,567 | A | | 4/1998 | Middleton | |
| 5,943,220 | A | | 8/1999 | Shikata et al. | |
| 6,051,806 | A | | 4/2000 | Shikata et al. | |
| 6,121,889 | A | * | 9/2000 | Janda et al. | ........... 340/815.47 |
| 6,555,785 | B2 | * | 4/2003 | Kawamoto et al. | ...... 219/130.5 |
| 6,596,972 | B1 | * | 7/2003 | Di Novo et al. | ......... 219/137.9 |

FOREIGN PATENT DOCUMENTS

| EP | 0 198 347 A3 | 10/1986 |
| GB | 1549399 | 8/1979 |
| GB | 2278501 A | 11/1994 |
| GB | 2314685 A | 1/1998 |

* cited by examiner

Primary Examiner—Clifford C. Shaw
(74) Attorney, Agent, or Firm—Duane Morris LLP

(57) ABSTRACT

A power supply apparatus has a case (94) with a control panel (96) mounted thereon. Plural controllers are disposed on the panel (96). A cover (98) is mounted to cover and uncover the panel (96). One (66) of the controllers is so disposed as to be externally operable.

7 Claims, 12 Drawing Sheets

POWER SUPPLY APPARATUS

This invention relates to a power supply apparatus, for example, a power supply apparatus for use with, for example, a welder.

BACKGROUND OF THE INVENTION

There are various welding techniques, such as manual welding and TIG welding. A power supply apparatus suitable for a particular welding technique is selected.

A general description of the basic structure of power supply apparatuses for welders is given hereunder. A commercial AC voltage is converted to a DC voltage by an input-side rectifier and a smoothing capacitor of a power supply apparatus. The DC voltage is converted to a high-frequency voltage in an inverter, which, in turn, is transformed to a desired voltage in a transformer. The resulting voltage is converted back to a DC voltage in an output-side rectifier for application to a load. If necessary, this ultimate DC voltage may be converted to a low-frequency AC voltage before it is applied to a load. By virtue of the use of an inverter for converting a DC voltage to a high-frequency voltage, this type of power supply apparatus can use a small-sized transformer, which results in downsizing of the power supply apparatus itself.

A power supply apparatus for use in manual welding with the above-described basic configuration has a constant-current output characteristic, in which a constant output current is provided even when its output voltage varies. The power supply apparatus is provided with a control panel on which an output current setter for setting the value of the output current is disposed.

In manual welding, when the welding is to be initiated or when, for example, a load including a welding torch and a workpiece is short-circuited, hot-starting of the welder may be employed for generating a desired arc by supplying to the load with current larger than the output current. A hot-start setter for setting the current to be supplied for hot-starting of the power supply apparatus is also disposed on the control panel. Indicators for indicating the magnitudes of the output voltage and current are also disposed on the control panel.

DC TIG welding is suitable for, for example, welding stainless steel, and a power supply apparatus for use in DC TIG welding has a constant-current output characteristic. DC TIG welding sometimes requires hot-starting as in manual welding. When DC TIG welding is employed for welding a flat workpiece, the output current value is held constant. On the other hand, when DC TIG welding is used for welding a workpiece like a pipe, a pulse output current is used. When a pipe, in particular its bottom portion, is welded with a constant output current, melt may drop from the pipe, which may necessitate another welding. Sometimes, melt may adhere to a TIG welding electrode of the torch and damage the electrode. By applying pulse current instead of a constant current, a molten weld pool formed in the bottom portion of the pipe is cooled down while a base portion IB of the pulse current is flowing, to thereby prevent the melt from dropping from the pool or adhering to the torch welding electrode.

There are two methods for initiating arcing in DC TIG welding. One is a touch-starting method in which a small current is supplied to the welding electrode with the electrode and the workpiece short-circuited, and, after that, the electrode is separated from the workpiece to thereby generate an arc between them. The other method is a high-frequency starting method, in which the welding electrode is kept separated from the workpiece, and a high-frequency, high voltage, which may have a frequency of from, for example, 1 MHz to 3 MHz and a magnitude of from, for example, 5 kV to 20 kV, is applied between them to thereby initiate arcing.

The power supply apparatus for DC TIG welding may be provided with a control panel with an output current setter and a hot-start setter disposed thereon. In addition to these setters, disposed on the control panel are up-ramping and down-ramping time setters for use when a pulse current is applied as an output current. The up-ramping time setter is for setting an up-ramping time during which a starting current increases to a maximum pulse current (i.e. a set output current), and the down-ramping time setter is used to set a down-ramping time during which the current decreases from the maximum pulse current value to the value of a crater current which is caused to flow at the end of the welding. Also disposed on the control panel are a pulse frequency setter for setting the frequency of the pulse current, a pulse current switch for switching the current to be supplied to the load between a DC current and a pulse current, an arc-initiating mode switch for switching the arc-initiating mode between the touch-starting mode and the high-frequency starting mode, and indicators for indicating the values of the output voltage and output current.

AC TIG welding is used for welding, for example, an aluminum material. An aluminum workpiece has an oxide film thereon having a high melting point. Therefore, if a DC power supply is used and current is supplied with a workpiece serving as a positive electrode and with a welding electrode serving as a negative electrode, the workpiece cannot be heated to a temperature high enough for welding. Accordingly, the workpiece is made a negative electrode with the welding electrode made to act as a positive electrode, thermoelectrons are emitted from the workpiece when current is supplied, which removes the surface oxide films, enabling the welding. The removal of oxide films is called "cleaning effect". On the other hand, when the workpiece is used as a positive electrode with the welding electrode made to act as a negative electrode, the electrode can be cooled. Accordingly, when AC TIG welding is used, both the cleaning effect and the cooling effect are available. By adjusting the time periods during which the workpiece is serving as a positive electrode and a negative electrode, the amounts of the cleaning and cooling effects can be adjusted.

An AC/DC TIG welder can be used both for AC TIG welding and DC TIG welding. On a control panel of a power supply apparatus for an AC/DC TIG welder, there are disposed an output current setter, a hot-start setter, an up-ramping and down-ramping time setters, a pulse frequency setter, a pulse current switch for switching supplied current between a DC current and a pulse current, an arc-initiating mode switch for switching the arc-initiating mode between the touch-starting mode and the high-frequency starting mode, and indicators for indicating the values of the output voltage and output current for DC TIG welding. In addition, there are disposed a voltage-frequency setter for setting the frequency of the voltage for the AC welding, a waveform balancer for setting the ratio between positive and negative portions of the pulse current.

Because of various setting devices put on control panels of power supply apparatuses for welders, as described above, various different procedures are required for manufacturing power supply apparatuses for various welding methods. Also, it requires complicated arrangements to manufacture a single power supply apparatus which can be used for various welding modes or techniques because of a number of setting devices. In addition, settings using such various setting devices will be very troublesome.

In Japanese Patent No. 3,231,694 issued on Sep. 14, 2001, or in corresponding U.S. Pat. No. 6,051,806 assigned to the same assignee of the present application, a power supply apparatus is disclosed, which includes a control panel. On the control panel, there are provided a welding mode selection push button with which a welding mode, e.g. manual welding or DC TIG welding, is selected, a parameter setting push button with which a parameter for the selected welding is set, and one setter with which output current, output voltage etc. are set for the selected welding mode. In addition, a welding mode indicator, a parameter indicator, an UP/DOWN push button for changing the set parameter, an output voltage indicator and an output current indicator.

Since power supply apparatuses are used not only indoors but also outdoors, they have to be protected from water drops and dust. For that purpose, a control panel of such power supply apparatuses may be provided with a water-proofing or dust-proofing cover. When an operator wants to use the power supply apparatus with a water-proofing panel cover, the operator has to remove the cover in order to set the welding mode, the parameter and the output voltage and current, which hinders prompt setting operations.

An object of the present invention is to provide a power supply apparatus which enables an operator to set various settings easily and promptly.

SUMMARY OF THE INVENTION

According to an embodiment of the present invention, a power supply apparatus includes a case with a control panel. A plurality of controllers are disposed on the control panel. The controllers may be for selectively setting operating modes, and various parameters. A cover is put on the control panel. The cover is desirably water and dust proofing. At least one of the controllers is externally operable so that it can be operated even when the cover is closed. For example, the externally operable controller may have a tip end extending outward through and beyond the cover. The externally operable controllers may be any controllers, but they are desirably controllers operated frequently.

The power supply apparatus according to the present invention may be used for welding and is operable in a desired one of a plurality of operating modes, such as a manual welding mode, a DC TIG welding mode and an AC TIG welding mode, for example. In this case, a parameter setting controller for use in setting a parameter for a selected mode may be an externally operable controller, so that there is no need for an operator to take the trouble to open the cover in order to change the parameter.

The externally operable controller may be arranged to be placed in a parameter setting mode when it is pressed. In the parameter setting mode, the externally operable controller can set a parameter by being rotated or slid. With this arrangement, even if an operator erroneously operate or rotate or slide the externally operable controller without first pressing it into the parameter setting mode, inadvertent change of the already set parameter can be prevented.

The cover may extend from one end to the other of the control panel with one end of the panel supported by a rotation shaft so that the cover can rotate about a rotation shaft The cover is provided with an opening. The opening is so positioned that when the cover is put over the control panel, the externally operable controller extends through it and a controller operating tip, e.g. knob of the externally operable controller can be outside the cover. The opening in the cover is arranged such that, when the cover is rotated open about the rotating shaft, the operating tip of the controller comes out of the opening. With this arrangement, the externally operable controller can be operated even when the cover is closed, and the controller does not interfere with the cover when it is rotated open.

According to another embodiment of the present invention, a power supply apparatus includes a case with a control panel. A plurality of controllers for setting characteristics of power supply circuitry housed in the case are disposed on the control panel. A cover is provided for the control panel. The cover, in its closed position, has at least part of each of the two side edges substantially contacting the case, and is mounted, at the contacting parts, to the case in such a manner as to be rotatable about an axis extending substantially perpendicularly to the side edges. For example, rotating shafts may be provided to extend along the rotation axis from the respective side edges of the cover. The rotating shafts are rotatably received by corresponding bearings formed on the case. On the other hand, rotating shafts may be provided to extend along the rotation axis from the case toward the cover which has holes for receiving the rotating shafts.

At least one protuberance is formed in either the side edges of the cover or the case on a circumference of a circle centered about the rotation axis. A plurality of protuberances may be formed along the circle at regular intervals. A plurality of recesses are formed in the other of the side edges of the cover and the case along the circumference of a corresponding circle centered about the rotation axis. The recesses are so positioned as to be able to receive the protuberance. The protuberance is adapted to be received in one of the recesses when the cover is closed, and, as the cover is opened wider, the protuberance moves to extend into successive ones of the recesses. When the cover is opened to a desired extent, it can keep its position since the protuberance engages with one of the recesses. Since the cover need not be held by hand, the operation of the controllers is easy.

A cable may be led into the case through a lead-in hole formed in the case. A first clamping member is formed integral with the case at a portion around the lead-in hole. The first clamping member is adapted to surround an approximately half of the circumference of the cable. A second clamping member is adapted to surround the remaining part of the circumference of the cable. The second clamping member can be secured to the first clamping member with the cable disposed therebetween, whereby the cable can be clamped easily.

The case may include front and rear case sections and an intermediate case section contacting and connecting the front and rear case sections. Circuit components of the power supply apparatus are disposed in the intermediate case section, and a water-proofing sheet is placed in the intermediate case section to cover the circuit components. The sheet includes a first flap extending from a portion of an upper part of the sheet into the front case section, and a second flap extending from a portion of the upper portion of the sheet into the rear case section.

With this arrangement, even if water, for example, rain, goes into the interior of the power supply apparatus through the abutment between, for example, the front and intermediate case sections, the water will flow over the first flap of the water-proofing sheet, and, therefore, the circuit components disposed inside the sheet will not be damaged by the water. The same thing can be said when water goes into the case through the abutment between the rear and intermediate case sections.

A first protrusion may be formed in one of the abutting end surfaces of the front and intermediate case sections, with a corresponding first recess formed in the other of the abutting end surfaces, and a second protrusion may be formed in one of the abutting end surfaces of the rear and intermediate case sections, with a corresponding second recess formed in the other of the abutting end surfaces. The first protrusion is arranged to be received in the first recess, while the second protrusion is arranged to be received in the second recess. When the front, intermediate and rear case sections are assembled, the first and second protrusions enter into the corresponding first and second recesses, and, therefore, the front, rear and intermediate case sections can be secured firmly together and will not be displaced.

DESCRIPTION OF EMBODIMENTS

Figure 1:
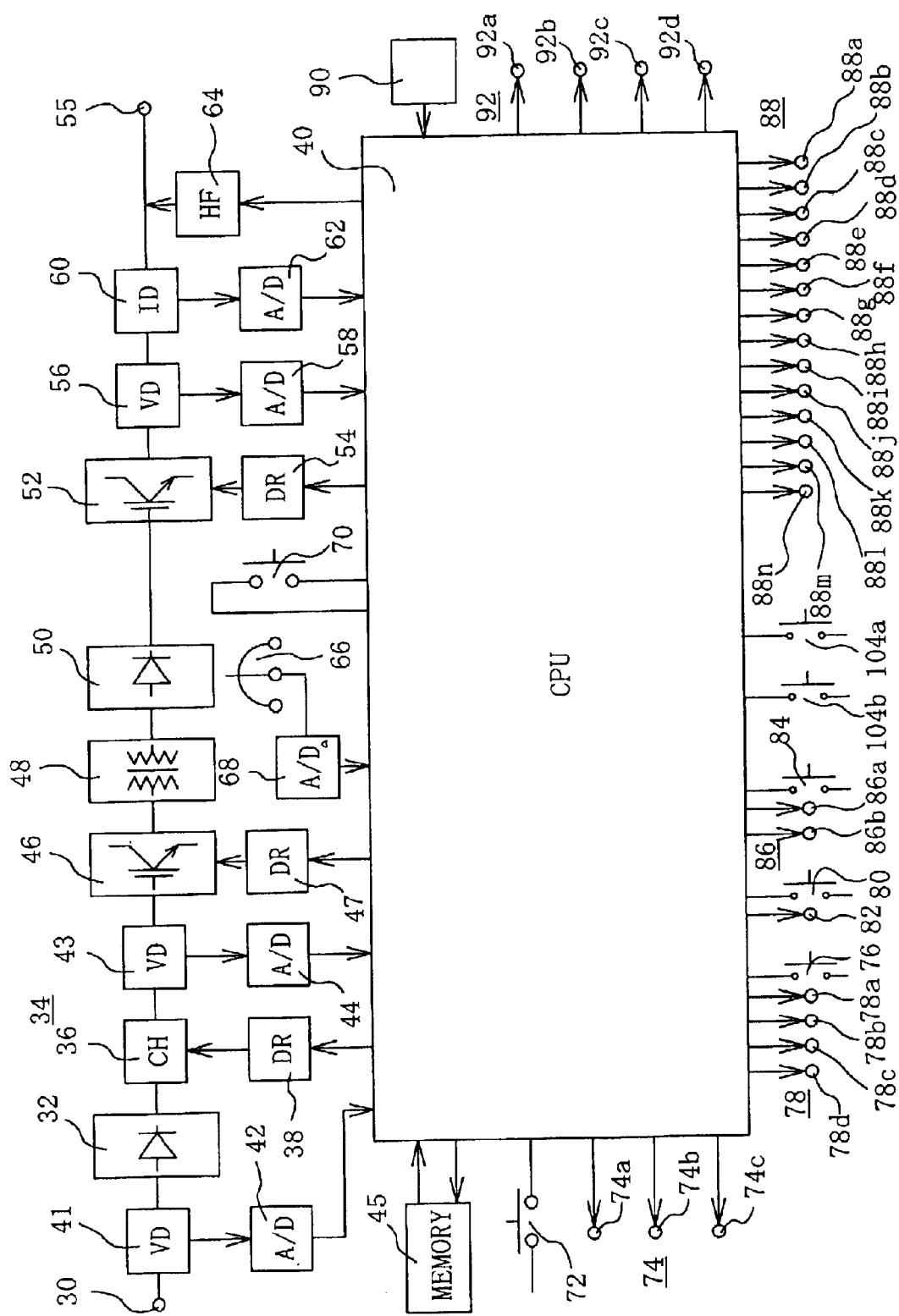
FIG. 1 is a block diagram of a power supply apparatus according to a first embodiment of the present invention.

A power supply apparatus according to a first embodiment of the present invention can be used with a welder. The power supply apparatus is useable in any one of manual welding, DC TIG welding and AC/DC TIG welding. As shown in FIG. 1, the power supply apparatus according to the first embodiment includes a power supply input terminal 30 to which an AC signal, e.g. a commercial AC voltage, is coupled. Although only one input terminal 30 is shown in FIG. 1, there are actually two such terminals to which a single-phase commercial AC voltage is coupled. Alternatively, a three-phase commercial AC voltage may be used, and, in such a case, three power supply input terminals must be provided. The power supply input terminal 30 is connected to an input-side AC-to-DC converting section 32, where the input AC signal or voltage is converted to a DC signal or voltage. The input-side AC-to-DC converter section 32 may comprise a rectifier and a smoothing capacitor.

The DC voltage from the input-side AC-to-DC converter 32 is applied to a constant voltage device 34, which includes switching means, for example, a chopper circuit (CH) 36. The chopper circuit 36 includes a semiconductor switching device, e.g. an IGBT, a power FET or a power bipolar transistor, which is rendered conductive while it is supplied with a control signal. The control signal, which on-off controls the chopper circuit 36, may be, for example, a PWM driver signal provided by chopper control means, for example, a chopper driver circuit (DR) 38. The driver circuit 38 develops the PWM driver signal in response to a command given by control means, for example, a CPU 40.

The input voltage at the power supply input terminal 30 is detected by an input voltage detector (VD) 41. An input voltage representative signal representing the input voltage as detected in the voltage detector 41 is converted into a digital input voltage representative signal in an analog-to-digital converter (A/D) 42 and, then, applied to the CPU 40.

Similarly, the output voltage of the chopper circuit 36 is detected in an output voltage detector (VD) 43, which develops an output voltage representative signal representing the output voltage of the chopper circuit 36. The output voltage representative signal from the output voltage detector 43 is converted into a digital output voltage representative signal in an analog-to-digital converter (A/D) 44 and is applied to the CPU 40.

The CPU 40 performs computation on the digital input and output voltage representative signals and data stored in memory means, for example, a memory 45 for so controlling the driver circuit 38 as to develop the PWM driver signal for making the output voltage of the chopper circuit 36 have a predetermined value. By this control, the constant voltage device 34 can output a predetermined constant voltage regardless of the input voltage applied to the power supply input terminal 30, that is, whether it is, for example, 200 V or 400V.

The output voltage of the constant voltage device 34 is applied to a DC-to-high frequency converter, for example, a high frequency inverter 46. The inverter 46 includes semiconductor switching devices similar to the one as used in the chopper circuit 36, which are connected in, for example, a full-bridge configuration. The inverter semiconductor switching devices are on-off controlled in response to control signals, for example, PWM driver signals, from inverter control means, for example, an inverter driver circuit (DR) 47. By this on-off control, the DC voltage from the chopper circuit 36 is converted into a high frequency voltage having a frequency of, for example, from ten-odd kilohertz to several hundred kilohertz. As will be described later, the inverter driver circuit 47 is supplied with a command from the CPU 40.

The high frequency voltage from the inverter 46 is applied to a transformer 48, where it is voltage-transformed to have a predetermined value. The voltage-transformed, high frequency voltage is then applied to an output-side high frequency-to-DC converter 50, where it is converted to a DC voltage. The high frequency-to-DC converter 50 may include a rectifier and a smoothing reactor.

The DC voltage from the converter 50 is applied to an AC/DC switching unit 52. The AC/DC switching unit 52 may include an inverter formed of semiconductor switching devices like the one used in the chopper circuit 36 connected in a full-bridge configuration. The semiconductor switching devices are on-off controlled in response to control signals, for example, PWM driver signals, from switching control means, for example, a switching driver circuit (DR) 54.

The driver circuit 54, upon receiving from the CPU 40, a command to switch to AC, PWM controls the respective semiconductor switching devices of the switching unit 52 in such a manner as to provide an AC voltage having a frequency of, for example, from ten-odd hertz to 200 Hz, which is lower than the frequency of the output voltage of the high frequency inverter 46.

Upon receiving a command to switch to DC from the CPU 40, the driver circuit 54 renders continuously conductive those two of the semiconductor switching devices of the switching unit 52 which are connected in series with a later-mentioned load intervening therebetween, whereby a DC voltage is continuously applied to the load. The two semiconductor switching devices to be render conductive are determined, depending on the sense of the DC voltage to be applied to the load.

As an alternative to the above-described AC/DC switching unit 52, the following arrangement may be used. Specifically, the output-side high frequency-to-DC converter 50 is configured to have a positive polarity output terminal, a negative polarity output terminal, and a feedback terminal. The positive polarity output terminal is connected through one chopper circuit to one end of the load, while the negative polarity output terminal is connected through another chopper circuit to the same one end of the load. The feedback terminal is connected to the other end of the load. When an AC voltage is to be applied to the load, the two chopper circuits are alternately rendered conductive, while one of the chopper circuits is made continuously conductive when a DC voltage is to be applied to the load.

The output voltage of the AC/DC switching unit 52 is applied to an output terminal 55. In FIG. 1, the apparatus is shown as if it had only one output terminal 55, but it actually has two output terminals. One of the output terminals is connected to a workpiece forming the load, and the other one is connected to a welding electrode for generating an arc between the workpiece and the electrode.

The output voltage of the AC/DC switching unit 52, i.e. the load voltage, is detected by an output voltage detector (VD) 56, which develops an output voltage representative signal. The output voltage representative signal is converted to a digital output voltage representative signal in an analog-to-digital converter (A/D) 58, which is, then, coupled to the CPU 40.

Similarly, the output current of the AC/DC switching unit 52, i.e. the load current, is detected by an output current detector (ID) 60, which develops an output current representative signal. The output current representative signal is converted to a digital output current representative signal in an analog-to-digital converter (A/D) 62, which is, then, coupled to the CPU 40.

The CPU 40, in response to the digital output voltage or current representative signal, provides a command to the inverter driver circuit 47 to develop such a PWM driver signal as to make the output voltage or output current have a predetermined value.

A high frequency generator (HF) 64 is connected to the output terminal 55. The high frequency generator 64 applies a high frequency voltage between the output terminals 55 for a predetermined short time period to cause an arc to be generated between the workpiece and the welding electrode. The high frequency voltage has a frequency of, for example, from 1 MHz to 3 MHz and a magnitude of, for example, from 5 KV to 20 KV. The turning on and off of the high frequency generator 64 is controlled by the CPU 40.

The CPU 40 is programmed so as to make the power supply apparatus useable in any of the manual welding, the high frequency starting TIG welding, the touch starting TIG welding, and the AC/DC TIG welding. The high frequency generator 64 is detachably mounted on a case 94 (FIG. 2) of the power supply apparatus.

Before operating the power supply apparatus, it is necessary to set various operating parameters. Examples of such parameters is a reference current representative signal, which is a signal representing a current to be supplied, as the load current in a constant current control configuration employed in manual welding and TIG welding. The reference current representative signal is set through a controller, e.g. a first parameter commander or, more specifically, an output setter 66. The reference current representative signal is then converted into a digital reference signal in an analog-to-digital converter (A/D) 68 before it is applied to the CPU 40. The setter 66 is of encoder type and has a push-button switch 70 for use in switching setting modes.

The CPU 40 includes, a controller, e.g. mode setting means or, more specifically, a welding mode setting push-button switch 72, and a welding mode indicator 74. The welding mode indicator 74 includes three lamps 74a, 74b and 74c for the manual welding mode, the high-frequency starting TIG welding mode, and the touch-starting TIG welding mode. When the mode setting push button 72 in its initial state is pressed and released once, the CPU 40 is placed in the manual welding mode, and the lamp 74a is energized to emit light, indicating that the manual welding mode has been selected. Another pressing of the button 72 places the CPU 40 in the high-frequency starting TIG mode, and the lamp 74b is energized to emit light. By pressing and releasing the button 72 once more, the CPU 40 is placed in the touch-starting TIG welding mode, and the lamp 74c indicating this welding mode emits light.

The CPU 40 includes also another controller, e.g. a second parameter commander or, more specifically, a current-mode setting push-button switch 76 and a current-mode indicator 78 with four indicator lamps 78a, 78b, 78c and 78d for four current-modes. When the button 76 in its initial state is pressed and released once, the CPU 40 is placed in a standard current mode in which a predetermined current is supplied to the load, and, at the same time, the lamp 78a corresponding to the standard current mode is energized. Another pressing and releasing of the button 76 in the standard current mode places the CPU 40 into a ramping current mode. In the ramping current mode, the slope of gradual up-ramping of the load current from the initial current to a predetermined value and the slope of gradual down-ramping of the load current from the predetermined value to a crater current are adjusted. In this mode, the lamp 78b corresponding to the ramping current mode is energized to emit light. When the push button 76 in the ramping current mode is pressed and released once more, the CPU 40 is placed in a repeating mode in which the ramping current mode repetitively takes place, and the lamp 78c indicating the repeating mode is turned on. If the push button 76 is pressed and released once more, the CPU 40 is switched into the spot-welding mode in which the load current is supplied for a short time to temporality weld the workpiece, and, at the same time, the lamp 78d for the spot-welding mode is turned on.

The CPU 40 has another controller, e.g. a third parameter commander or, more specifically, a pulse-mode push-button switch 80, and a pulse-mode indicator 82. Pushing down the switch 80, the CPU 40 is switched into a pulse mode in which a pulse current is supplied as the load current, and the lamp 82 is turned on. By pressing and releasing the button 80, the CPU 40 is released from the pulse mode, and the load current changes to a DC current, and the lamp 82 is turned off.

Another controller, a fourth parameter commander or, more specifically, an AC/DC switching push-button switch 84 and an AC/DC indicator 86 are provided for the CPU 40. The AC/DC indicator 86 has lamps 86a and 86b for indicating the DC TIG welding mode and the AC TIG welding mode. When the AC/DC switching push-button switch 84 is pressed and released, the CPU 40 is placed in the DC TIG welding mode and the lamp 86a indicating the DC TIG welding mode is turned on. When the button 84 is pressed once more, the CPU 40 is put into the AC TIG welding mode, and the lamp 86b is turned on.

An output mode indicator 88 is also provided for the CPU 40, which has fourteen (14) indicator lamps 88a through 88n. The lamp 88a is turned on when the apparatus is placed in a pre-flow state in which an inert gas is supplied from before the welding takes place.

The indicator lamp 88b is turned on when a hot-start current is set. The lamp 88c is turned on when a start-up current is set. The lamp 88d is turned on when the up-ramping time is set, and the lamp 88e is on when the pulse current value is set. The lamp 88f is turned on when the base portion of the pulse current is set. The lamp 88g is turned on when the time at which the spot-welding current is to be interrupted. The lamp 88h is turned on when the width of a pulse of the pulse current is to be set, and the lamp 88i is turned on when the pulse current frequency is set. The lamp 88j is turned on when the frequency of the current in AC welding is set, and the lamp 88k is turned on when the ratio between positive and negative portions of the current in AC welding is set. The lamp 88l is turned on when the down-ramping time is set. The lamp 88m is turned on when the crater current is set, and the lamp 88n is turned on when the apparatus is placed in a post-flow state in which an inert gas is supplied after the completion of the welding.

For setting these values, the above-described setter 66 is used, and an output display 90 is used to display set values. A set parameter display 92 is provided for indicating a parameter of which the value has been set. The set parameter indicator 92 includes lamps 92a, 92b, 92c and 92d for current, ratio (in percent), time and frequency, respectively.

Figure 2:
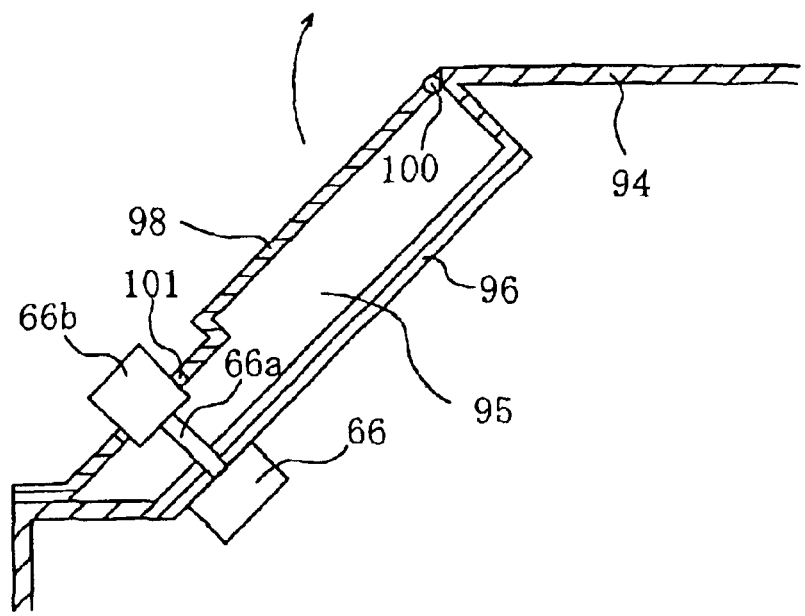
FIG. 2 is a cross-sectional view of part of the power supply apparatus shown in FIG. 1.
Figure 3:
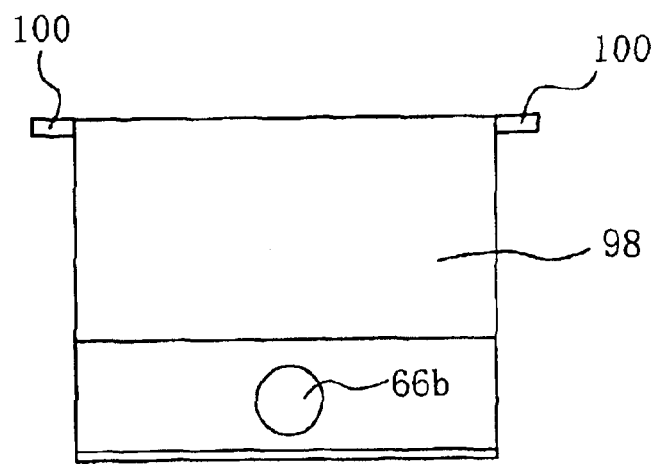
FIG. 3 is a front view of a panel cover of the power supply apparatus of FIG. 1.
Figure 4:
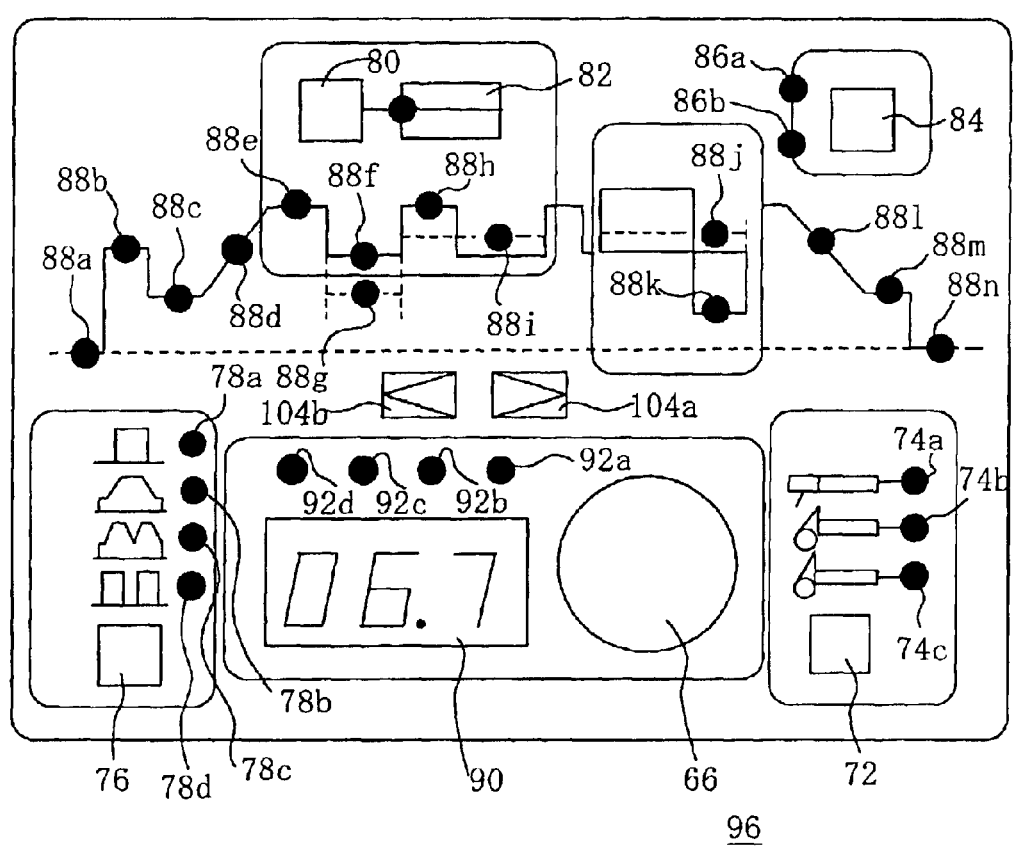
FIG. 4 is a front view of a control panel of the power supply apparatus for FIG. 1.

The above-described setters and indicators are disposed on a control panel 96 (FIG. 2) on the case 94. Details of the control panel 96 are shown in FIG. 4. As shown in FIG. 2, the control panel 96 is of generally rectangular shape and is disposed in a recess 95 formed in an upper portion of the front surface of the case 94 to face diagonally upward.

A panel cover, e.g. a water-proofing and dust-proofing, transparent cover 98 for the control panel 96 is attached in a spaced, parallel relation to the control panel 96. Because of the transparency of the panel cover 98, the indications on the control panel 96 can be seen without removing the cover. The shape of the panel cover 98 is generally conformable to the control panel 96. As shown in FIG. 2, rotation shafts 100 extend outward from the upper ends of the side edges of the cover 98. The shafts 100 are inserted into associated holes (not shown) formed in the corresponding side walls of the recess 95 in the case 94 so that the cover 98 is rotatable in the direction indicated by an arrow in FIG. 2 and in the opposite direction and, therefore, can move between the fully open position and the fully closed position.

In a lower portion of the cover 98, there is formed a setback, and the output setter 66 is disposed on the control panel 96 at a portion corresponding to the setback. A control rod 66a of the output setter 66 extends toward the setback. The control rod 66a has a cylindrical control knob 66b at its distal tip end. Part of the control knob 66b protrudes out beyond the setback through a window 101 formed in the setback portion of the cover 98 so that it can be operated even when the cover 98 is in its closed position. When the knob 66b is pressed toward the panel 96, the setter switch 70 is operated, and when the knob 66b is rotated about the rod 66a, the output setter 66 operates. The size of the window 101 is determined such that the knob 66b does not interfere with the cover 98 when it is opened and the water-proofing and dust-proofing property of the cover 98 is not degraded by the presence of the window 101. The setter 66 is an externally operable controller.

Setting for manual welding of the power supply apparatus with the above-described arrangement may be done in the following manner, for example. First, the panel cover 98 is opened, and the manual welding mode is selected by operating the mode setting switch 72. This causes the lamp 74a to be turned on. In this state, the knob 66a of the output setter 66 is pressed to operate the setter switch 70, causing the indicator lamp 88b to be turned on for indicating that the hot-start current is being set. At the same time, the lamp 92a is turned on to indicate that the value being set is a current value. The value of the hot-start current is set by rotating the knob 66b of the setter 66, and the value is displayed on the output display 90. Then, the knob 66b is pressed again to operate the switch 70, which causes the lamp 88f to be turned on, indicating that the welding current value is being set. Also, the lamp 92a is turned on to indicate that the value being set is the value of current. By turning the knob 66b of the setter 66, the value of the welding current is set and displayed on the output display 90, which completes the setting for the manual welding.

Settings for high-frequency starting DC TIG welding may be done in the following manner, for example.

First, the panel cover 98 is opened, and the switch 72 is pressed to select the high-frequency starting mode. This causes the lamp 74b to be turned on. Then, the current mode setting switch 76 is pressed to select a desired welding mode. Assuming that the ramping current mode has been selected, the lamp 78b is turned on. Then, the pulse-mode push-button switch 80 is pressed to select the pulse mode, which results in turning on of the lamp 82. Then, the AC/DC switching button 84 is pressed to select the DC welding mode, which causes the lamp 86a to be turned on.

After that, the setter 66 is pressed to operate the switch 70 and the lamp 88b is turned on, which indicates that the hot-start current is being set. At the same time, the lamp 92a is turned on to indicate that the parameter being set is current. Then, the knob 66b of the output setter 66 is rotated to set the value of the hot-start current, and the hot-start current value is displayed on the display 90.

By pushing down the setter 66 once more, causing the switch 70 to operate, the indicator lamp 88c is turned on to indicate that the welding starting current is being set. At the same time, the lamp 92a is turned on to indicate that the parameter being set is current. The value of the welding starting current is set by rotating the knob 66b, and the set value is displayed on the display 90.

The setter 66 is pressed again to operate the switch 70, which turns on the lamp 88d to indicate that the apparatus is placed in the up-ramping time setting mode. The lamp 92c is turned on to indicate that the parameter being set is time. The up-ramping time of the welding current is set by rotating the knob 66b of the output setter 66, and the set time is displayed on the display 90.

Another pressing down of the setter 66 causes the apparatus to be placed in the peak current setting state, and the lamp 88e is turned on to indicate it. The lamp 92a is turned on to show that the parameter to be set is current. Then, the knob 66b is rotated to set the value of the peak current, which, in turn, is displayed on the display 90.

If the output setter 66 is pressed again, the switch 70 is activated, and the lamp 88f is energized to show that the apparatus is in the base current setting state. The lamp 92a indicates that the parameter to be set is current. The knob 66b is then rotated to determined the value of the base portion of the pulse current, and the value is displayed on the display 60.

When the setter 66 is pressed once more, activating the switch 70, the lamp 88h is turned on to indicate that the apparatus is in the pulse width setting mode. The indicator lamp 92c is turned on to indicate that the parameter being set is time. The pulse width of the pulse current is determined by rotating the knob 66b, and the pulse width thus determined is displayed on the display 90.

When the switch 70 is activated again in response to another pressing of the output setter 66, the apparatus is placed in the pulse frequency setting mode, which is indicated by the lamp 88i. The lamp 99d indicates that the parameter to be set is frequency. The knob 66b is rotated to set the frequency, which is, then, displayed on the display 90.

By pressing the output setter 66 again, the switch 70 is activated, and the lamp 88l is energized to emit light to indicate that the apparatus is in the down-ramping time setting mode. Then, the knob 66b of the output setter 66 is rotated to determine the down-ramping time, which is, then, displayed on the display 90.

The output setter 66 is pressed again to activate the switch 70, to place the apparatus in the crater current setting mode, which is indicated by the turned on lamp 88m. The turning on of the lamp 92a indicates that the parameter to be set is current. The knob 66b is then rotated to determine the value of the crater current, and the determined current value is displayed on the display 90. This completes the setting for the high-frequency starting DC TIG welding.

For setting the AC TIG high-frequency starting welding, the same setting procedure as the high-frequency starting DC TIG welding done until the operation of the AC/DC switch 84 is followed. For setting the AC TIG high-frequency starting welding, the AC welding is selected by operating the AC/DC selecting switch 84. Then, the apparatus is placed in the AC TIG high-frequency starting mode, which is indicated by the energized lamp 86b. Thereafter, the same setting procedure as the DC TIG high-frequency starting welding is followed. The setter 66 is pressed to activate the switch 70 to place the apparatus in the AC frequency setting mode, which is indicated by the indicator lamp 88j. The fact that frequency is being set is indicated by the turning on of the lamp 92d. Then, the knob 66b is rotated to set the AC frequency, and the determined frequency is displayed on the display 90.

Then, the setter 66 is pressed to activate the switch 70, and the apparatus is placed in the AC waveform balancing mode, which is indicated by the lamp 88k. The lamp 92b, which is now turned on, indicates that the parameter to be set is a ratio (%). By rotating the knob 66b, the AC waveform balancing is done. The ratio is displayed on the display 90, which completes the setting for the AC TIG high-frequency starting welding.

For setting parameters for the touch-starting TIG welding, first the cover 98 is opened, and the welding mode setting switch 72 is pressed to select the touch-starting. Then, the lamp 74c is turned on. After that, the same setting procedure as the high-frequency starting mode is followed.

It may be desired to alter the set values after the completion of setting for a desired welding mode. Since the knob 66a extends out of the window 101 in the panel cover 98 and, therefore, is accessible without opening the cover 98, alteration of the set values can be done without opening the cover 98. By repetitively pressing the setter 66, the parameter to be altered can be attained. After that, the knob 66b is rotated to alter the set value to a desired one.

Heretofore, the present invention has been described by means of manual welding and TIG welding, but it can be applied to MIG welding and MAG welding, too.

In the above-described example, only the output setter 66 has been described to be externally operable, but it should be understood that other controllers may be arranged to be externally operable.

Figure 5:
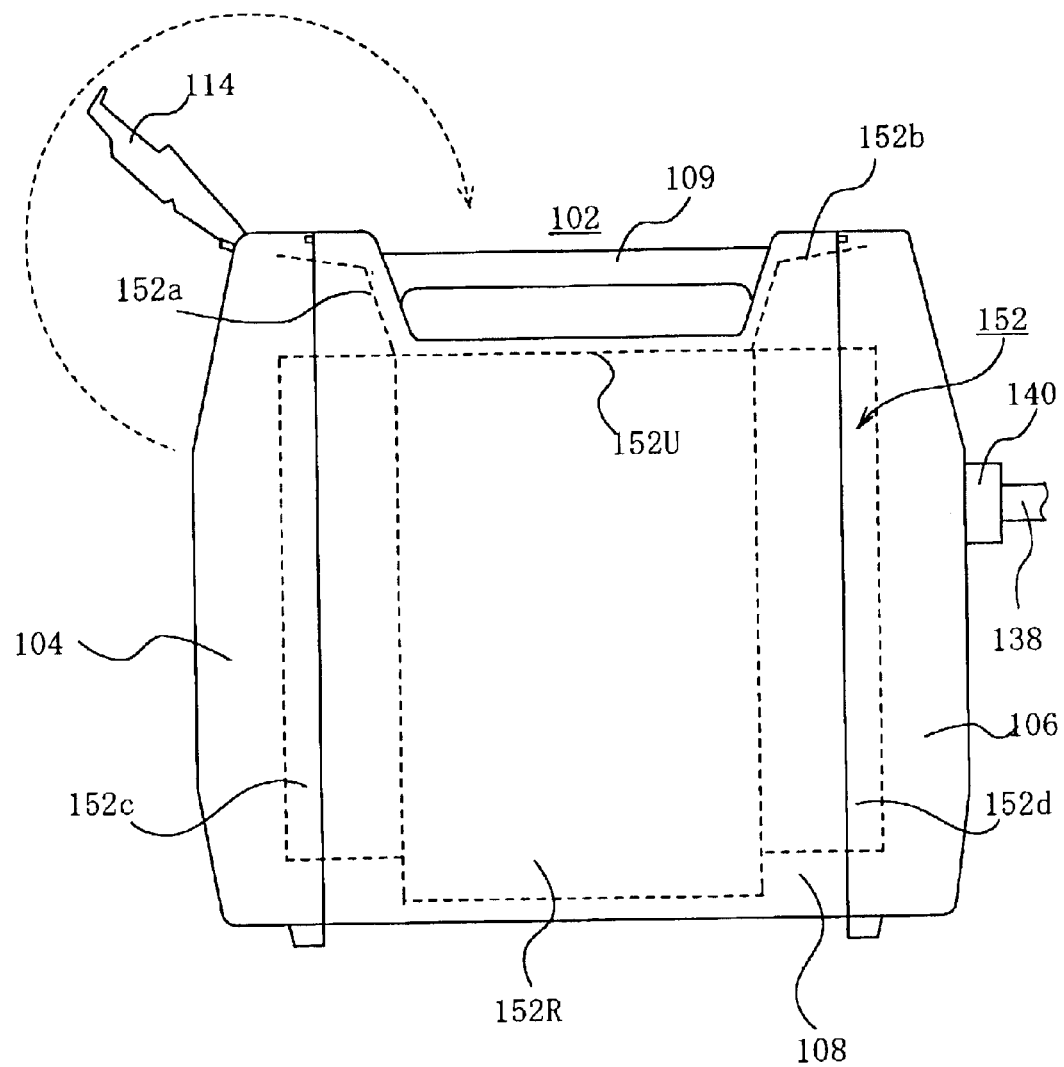
FIG. 5 is a side view of a power supply apparatus according to a second embodiment of the present invention.

A power supply apparatus according to a second embodiment of the present invention may also be used with a welder. The apparatus according to the second embodiment includes a case 102 as shown in FIG. 5. The case 102 is formed of a front section 104, a rear section 106 and an intermediate section 108 and may be formed of synthetic resin.

The front and rear sections 104 and 106 have the same dimensions and shape. The front and rear sections 104 and 106 are generally flat and rectangular, and cup-shaped with their open sides facing each other with a predetermined spacing disposed therebetween.

Figure 6:
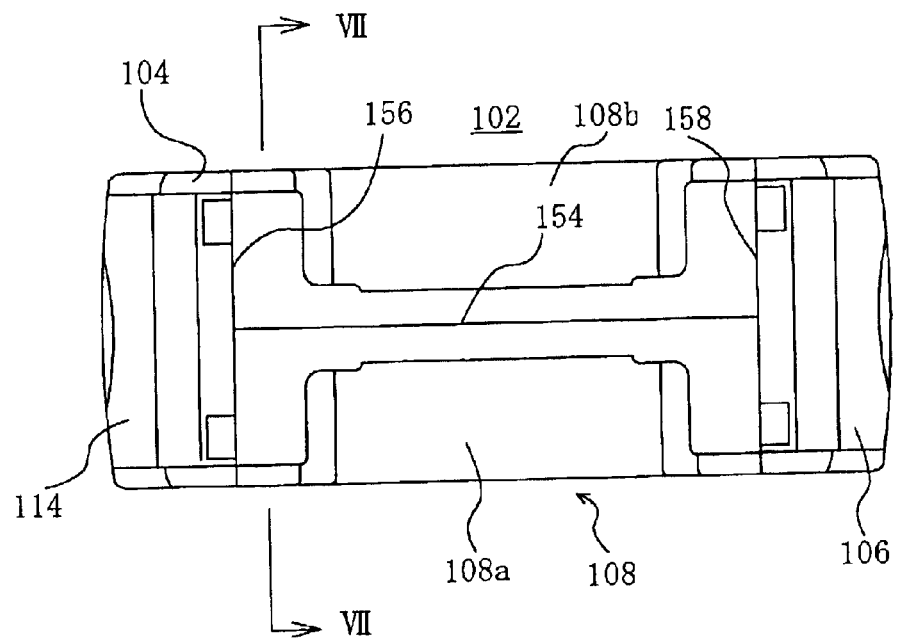
FIG. 6 is a plan view of the apparatus shown in FIG. 5.
Figure 7:
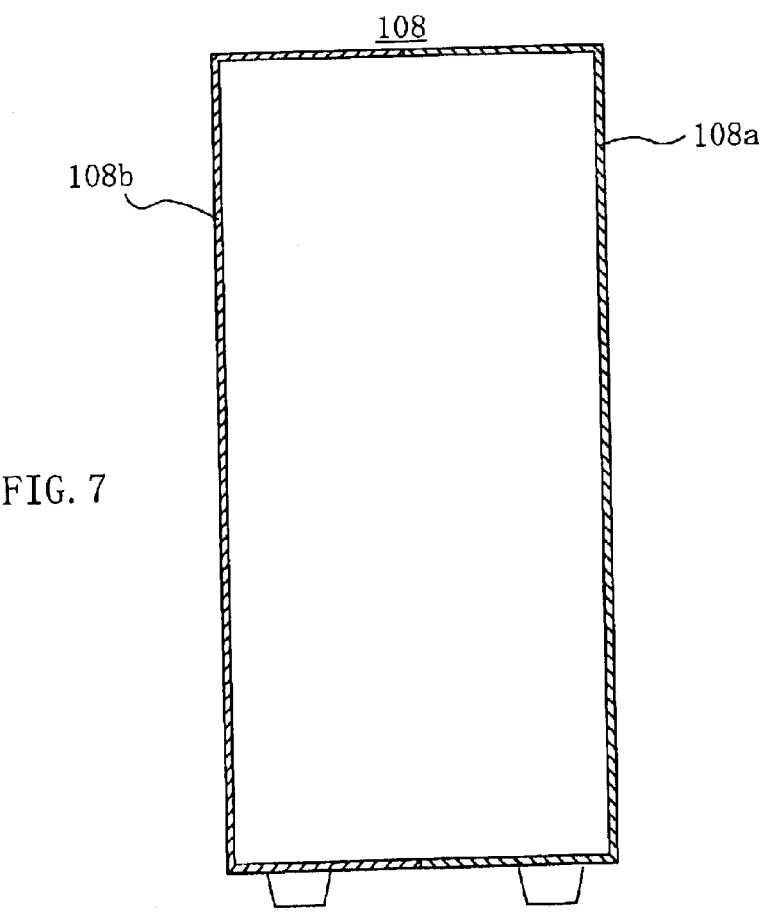
FIG. 7 is a cross-sectional view of an intermediate section of the power supply apparatus along the line VII—VII in FIG. 6.

The intermediate section 108 is a generally rectangular hollow member and is disposed between the front and rear sections 104 and 106, with its open ends contacting the respective open ends of the front and rear sections 104 and 106. As show in FIGS. 6 and 7, the intermediate section 108 is formed of two parts having a generally U-shaped cross-section, namely, a right part 108a and a left part 108b. The two intermediate section parts 108a and 108b are disposed with their open ends facing sideways with each other. The open ends of the parts 108a and 108b contact each other, as shown in FIG. 7. Within the hollow of the intermediate section 108, power supply circuitry (not shown) like the one shown and described with reference to the first embodiment is disposed. A handle 109 is formed to locate in the top, center portion of the intermediate section 108 which has been formed by assembling the right and left intermediate section parts 108a and 108b to abut each other.

Figure 8:
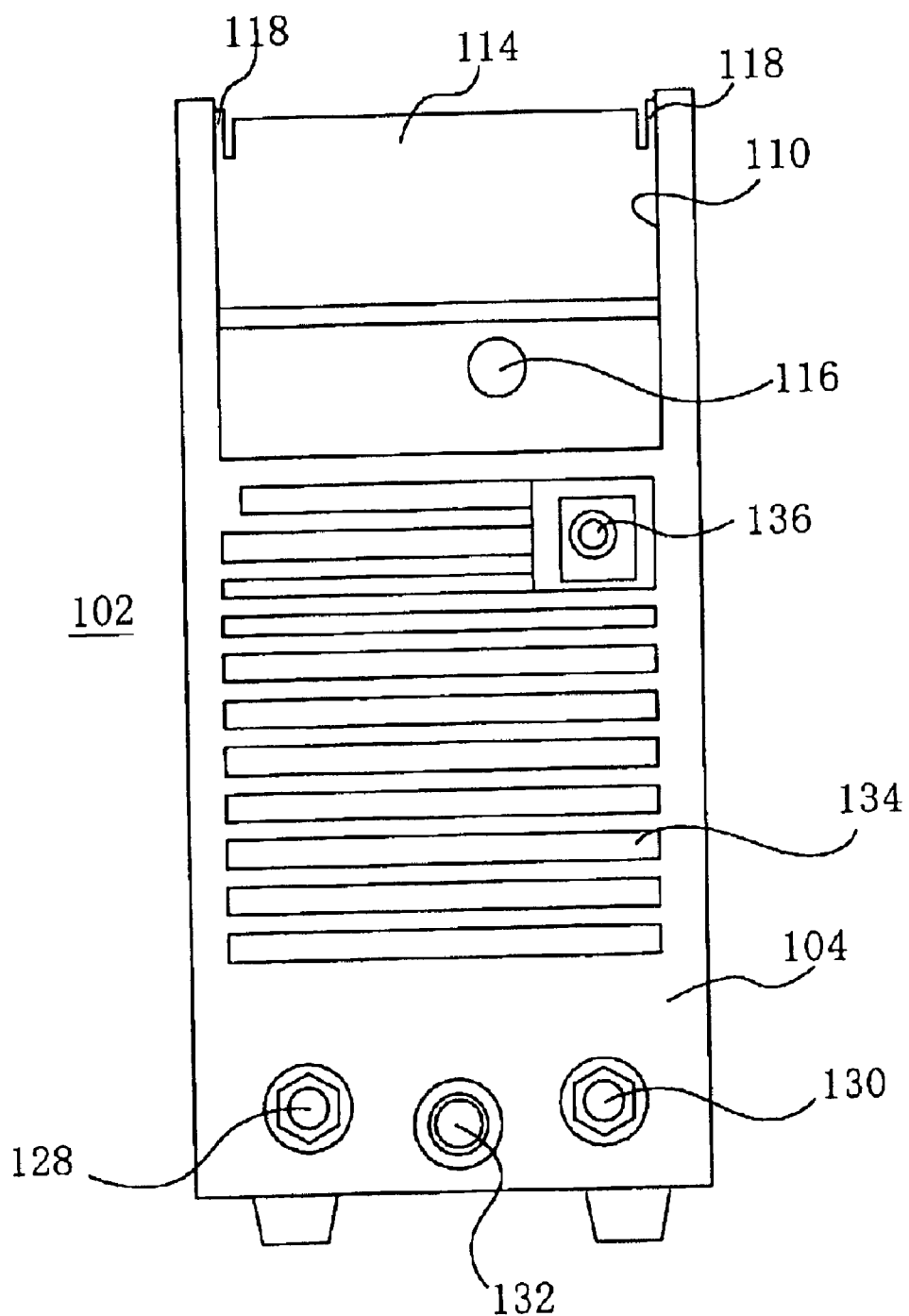
FIG. 8 is a front view of the power supply apparatus shown in FIG. 5.
Figure 9:
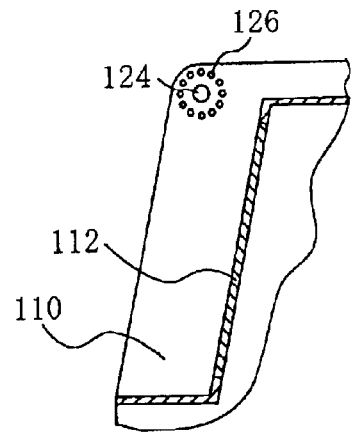
FIG. 9 is a cross-sectional view of part of a front section of a case of the power supply apparatus of FIG. 5.

As shown in FIGS. 8 and 9, a recess 110 is formed in an upper portion of the front section 102. The recess 110 faces slightly diagonally upward. A control panel 112 is disposed in the recess 110 as shown in FIG. 9. As in the power supply apparatus according to the first embodiment, controllers (not shown), such as switches and rotary knobs, for setting various parameters for determining the characteristics of the power supply apparatus are mounted on the control panel 112.

A dust-proofing panel cover 114 shown in FIG. 8 is mounted to close the recess 110. The cover 114 is transparent so that, although not shown in FIG. 8, the settings on the control panel 112 can be seen through it even when the cover 114 closes the recess 110.

A member 116 in FIG. 8 is one of the controllers, which extends out through the panel cover 114 so that it can be externally operated even when the panel cover 114 is placed over the recess 110. This controller 116 is similar to the controller 66 of the first embodiment.

Figure 10:
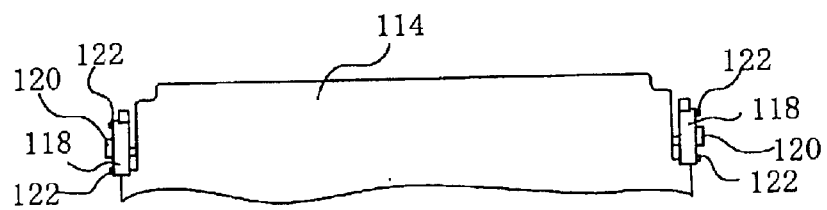
FIG. 10 is plan view of part of a panel cover of the power supply apparatus of FIG. 5.
Figure 11:
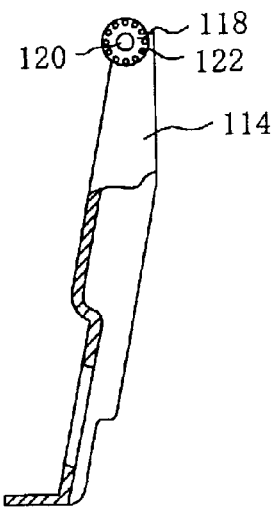
FIG. 11 is a partially broken away, side view of the cover shown in FIG. 10.

As shown in FIG. 10, discs 118 are formed on respective top ends of the opposite side edges of the panel cover 114. Shafts 120 extend substantially perpendicularly outward from the centers of the respective discs 118. A plurality of protrusions 122 are formed along a circumference of a circle centered about each shaft 120. The protrusions 122 are equiangularly spaced.

In the side walls of the recess 110, bearings, such as shaft receiving holes 124 are formed at locations corresponding to the shafts 120 of the panel cover 114. Each of the holes 124 receives a respective one of the shafts 120 in such a manner that the cover 114 can rotate about the shafts 120. Along the circumference of a circle about each of the shaft receiving holes 124, a plurality of dimples 126 are formed in the side wall of the recess 110 with the same angular spacing between adjacent ones as the protrusions 122 in the discs 118 so that they can receive the protrusions 122.

The shafts 120 of the panel cover 114 are inserted into the associated shaft receiving holes 124 so that the cover 114 can rotate about the shafts 120 as indicated by a dotted arrow in FIG. 5. As the cover 114 rotates, each of the protrusions 122 on the discs 118 successively engages with different ones of the dimples 126, and, therefore, the cover 114 can be maintained at a desired angular position as shown in FIG. 5. Accordingly, when an operator operates a controller on the control panel 112, there is no need for holding the cover 114, which makes parameter setting easier.

Members 128 and 130 shown in FIG. 8 are plus and minus output terminals, respectively, and a member 132 is an inert gas output port. A reference numeral "134" in FIG. 8 is for slits or windows through which air can be introduced into the interior of the case 102. A member 136 is a terminal adapted for connection to a torch switch.

Figure 12:
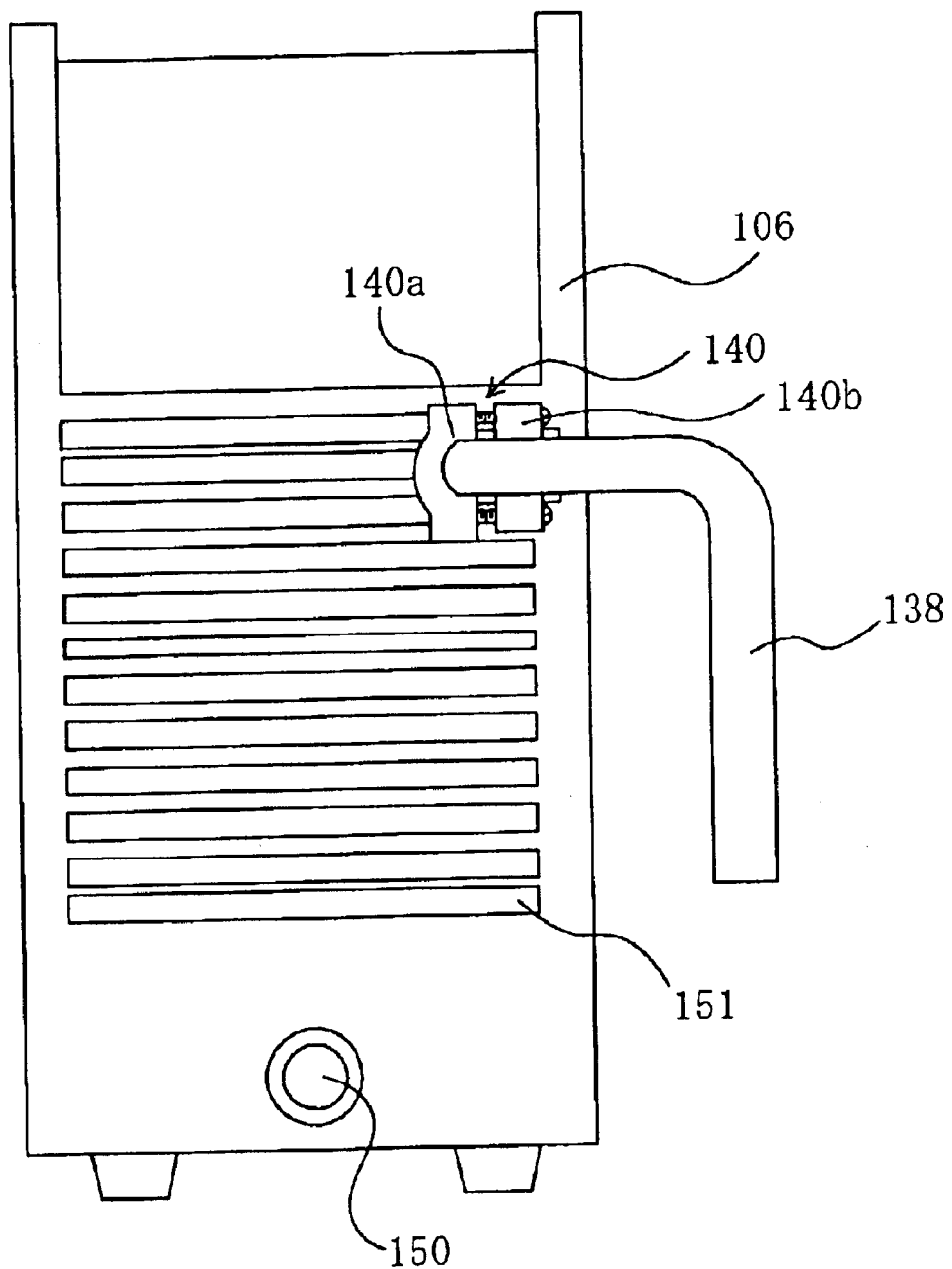
FIG. 12 is a rear view of the power supply apparatus shown in FIG. 5.
Figure 13:
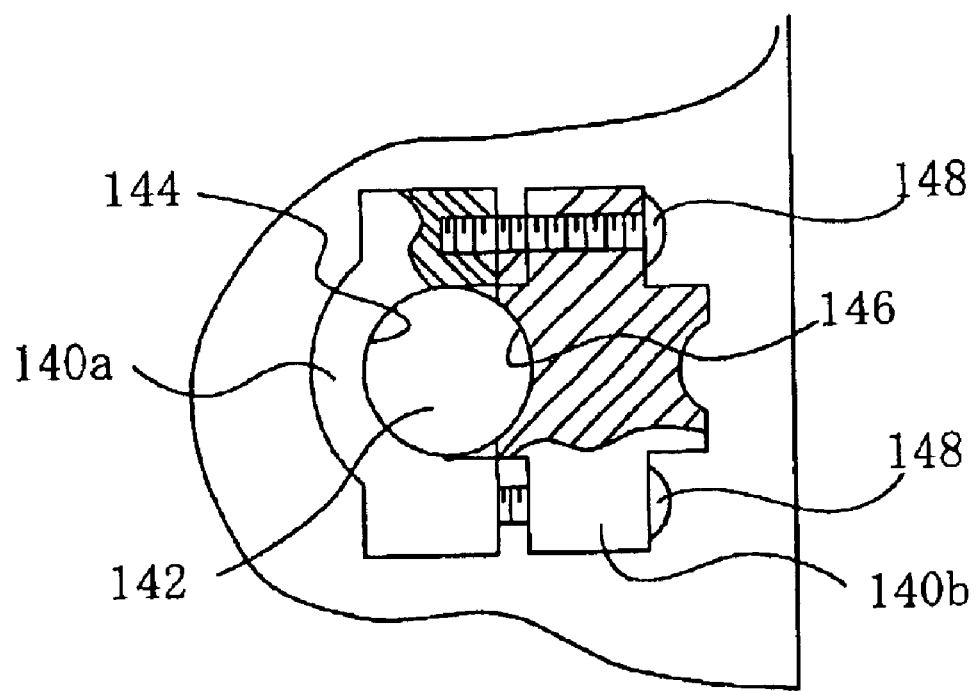
FIG. 13 is a partially broken away, enlarged view of part of the rear section of the power supply apparatus of FIG. 5.

Through the rear section 106, a cable, e.g. a power supply cable 138 is led into the case, as shown in FIG. 12, for supplying commercial AC power to the power supply circuitry within the case 102. In order to prevent the cable 138 from slipping off from the case 102, a clamp 140 is used to secure the cable 138. The clamp device 140 includes first and second clamping members 140a and 140b, as shown in FIG. 13. The first and second claming members 140a and 140b are both formed of synthetic resin, and the first clamping member 140a is formed integral with the rear section 106 and has a concave surface 144 which extends along about three quarters (¾) of the circumference of a circular cable introducing hole 142 in the rear section 106. The second clamping member 140b is a discrete member and has a concave surface 146 which can surround the remaining portion of the circumference of the hole 142.

The power supply cable 138 is clamped by bringing the cable 138 into contact with the concave surface 144 of the first clamping member 140a, contacting the concave surface 146 of the second clamping member 140b with the remaining portion of the cable 138, pressing the second clamping member 140b toward the first clamping member 140a, and securing the second clamping member 140b to the first clamping member 140a by securing means, e.g. by screwing threaded bolts 148 into the first clamping member 140a through the second clamping member 140b, as shown in FIG. 13.

In prior art apparatuses, first and second clamping members corresponding to the first and second clamping members 140a and 140b are formed as discrete members separate from a case of a power supply apparatus, and, therefore, the first clamping member must be first secured to the case, which requires additional work. On the other hand, according to the present invention, the first clamping member 140a is formed integral with the rear section 106 of the case 102, eliminating the work to secure it to the rear section 106, and thereby improving the efficiency of assembling the apparatus. In addition, since the clamping members 140a and 140b are made of synthetic resin, they are never eroded.

A member 150 shown in FIG. 12 is an inert gas input terminal.

As indicated by broken lines in FIG. 5, an internal cover 152 is disposed to cover the power supply circuitry within the intermediate section 108. The internal cover 152 is formed of a sheet of electrically conductive material, e.g. a metal thin sheet or, more specifically, a thin sheet or foil of aluminum or copper, having its major surfaces coated with an anti-erosive, heat-resistant material, e.g. heat resistant vinyl chloride or heat resistant polyester. In place of a metal sheet, a sheet of electrically conductive carbon resin may be used. Since a thin metal sheet coated with a resin like the one stated above is relatively soft, a cover of desired shape can be easily made from one sheet by providing cuts and folding it.

Figure 14:
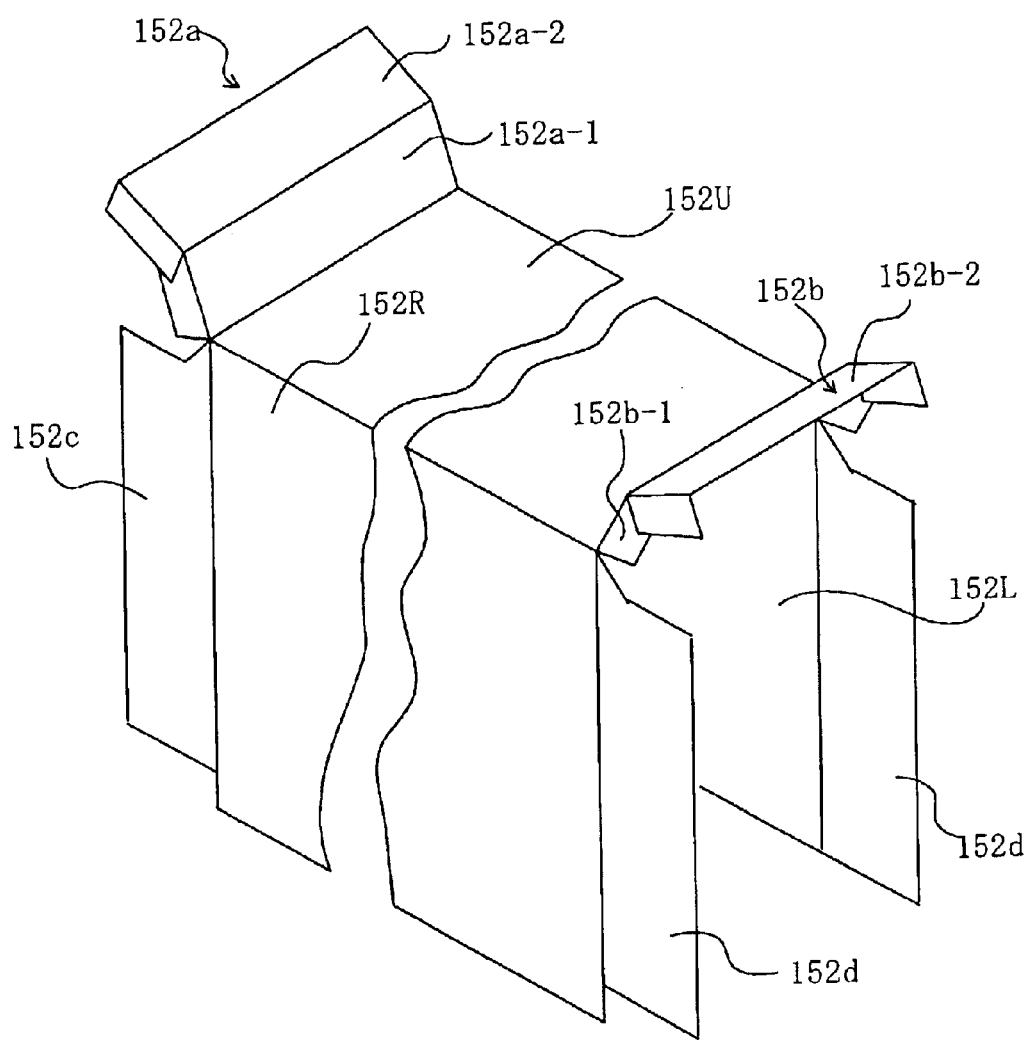
FIG. 14 is a perspective view of part of an internal cover useable in the power supply apparatus of FIG. 5.

As shown in FIG. 14, the internal cover 152 has an upper wall 152U, and two side walls 152R and 152L extending downward from opposing longer edges of the upper wall 152U. As is seen from FIG. 5, the upper wall 152U is located near to and has a size substantially equal to the top wall of the intermediate section 108 of the case 102. The short sides of the upper wall 152U are located near the abutting edges of the front and intermediate sections 104 and 108 and the abutting edges of the rear and intermediate sections 106 and 108, respectively, within the intermediate section 108. The bottom edges of the side walls 152R and 152L are in contact with the bottom wall of the intermediate section 108. The reference potential point of the power supply circuitry is connected to the internal cover 152 at one or more locations so that the internal cover 152 can function as a shield casing.

A front flap 152a extends from the front side edge of the upper wall 152U into the front section 104. The front flap 152a includes a first sloping portion 152a-1 extending diagonally upward from the front edge of the upper wall 152U and a second sloping portion 152a-2 continuous to the first sloping portion 152a-1. The second sloping portion 152a-2 extends slantwise upward at a gentle sloping angle than the first sloping portion 152a-1.

A rear flap 152b similar to the front flap 152a extends from the rear side edge of the upper wall 152U into the rear section 106. The rear flap includes a first sloping portion 152b-1 and a second sloping portion 152b-2 which are configured similarly to the first and second sloping portions 152a-1 and 152a-2 of the front flap 152a.

Also, side flaps 152c extend from the respective front edges of the side walls 152R and 152L into the front section 104. Similar side flaps 152d extend from the respective rear edges of the side walls 152R and 152L into the rear section 106. The bottom edges of the side flap 152c and 152d are located substantially at the bottom walls of the front and rear sections 104 and 106.

The internal cover 152 having an electrically conductive core sheet functions as a shield to prevent high frequency signals from a noise source near the power supply apparatus from reaching the power supply circuitry and, thereby, preventing the power supply circuitry from operating erroneously. Also, if water enters into the interior of the case 102 through the abutment 154 between the right and left intermediate parts 108a and 108b (FIG. 6), the upper wall 152U of the cover 152 can receive water, whereby it can prevent the power supply circuitry from being soaked with the water. Also, if water enters through the abutment 156 between the front and intermediate sections 104 and 108 or through the abutment 158 between the rear and intermediate sections 106 and 108, it flows along on the front or rear flap 152a or 152b onto the upper wall 152U, whereby the power supply circuitry is not soaked with such water, either.

U.S. Pat. No. 5,943,220 discloses a power supply apparatus with an internal cover having portions similar to the upper wall 152U and the side walls 152R and 152L. The internal cover of this patent does not have portions corresponding to the front and rear flaps 152a and 152b, and, therefore, water coming into the case 102 through the abutments 156 and 158 cannot be prevented from dropping onto the power supply circuitry.

Figure 15:
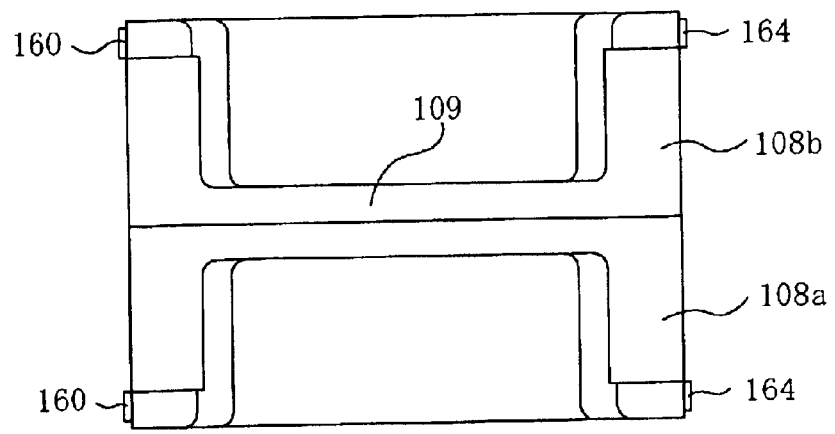
FIG. 15 is a plan view of the intermediate section of the case of the power supply apparatus of FIG. 5.
Figure 16:
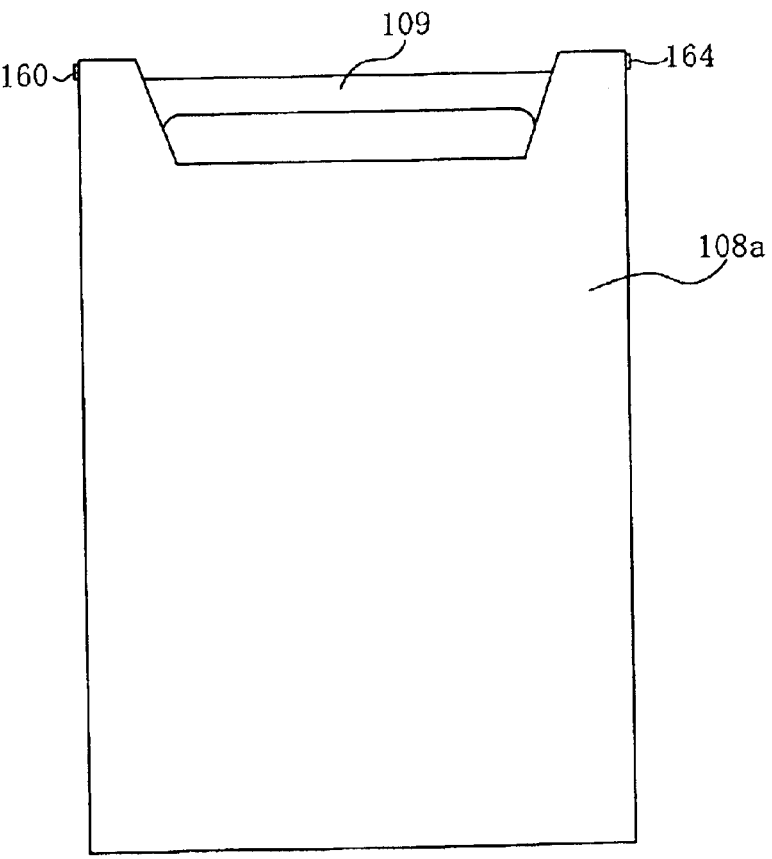
FIG. 16 is a side view of the intermediate section shown in FIG. 15.
Figure 17:
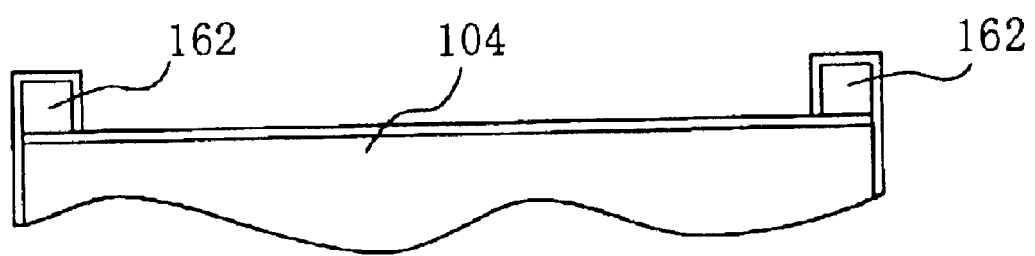
FIG. 17 is a rear view of part of the front section of the case of the power supply apparatus shown in FIG. 5.

As shown in FIGS. 15 and 16, a plurality, e.g. two, of protrusions 160 are formed to extend toward the front section 104 from upper portions of the front end surface of the intermediate section 108, which is adapted to abut the rear end surface of the front section 104. As shown in FIG. 15, the protrusions 160 are each formed on the respective one of the right and left parts 108a and 108b of the intermediate section 108 at their upper outermost ends. Recesses 162 are formed in the rear end surface of the front section 104. The recesses 162 are adapted to receive associated ones of the protrusions 160 so that the intermediate and front sections 108 and 104 can intimately and firmly engage with each other. Similar protrusions 164 are formed to extend from the upper outermost ends of the rear end surface of the intermediate sections 108 toward the rear section 106. Although not shown, recesses similar to the ones 162 are formed in the front end surface of the rear section 106. Such recesses function similarly to the recesses 162.

With the protrusions 160 and 164 engaging, respectively, with the recesses 162 in the front section 104 and with the similar recesses in the rear section 106, when the case 102 is lifted up by the handle 109, for example, the front and intermediate sections 104 and 108 are not displaced with respect to each other. Without such protrusions and recesses, the intermediate section 108 which houses a relatively heavy components such as the power supply circuitry may be displaced vertically with respect to the front and rear sections 104 and 106 where there are no heavy components, when the power supply apparatus is lifted up by the handle 109. The provision of the protrusions and recesses prevents it.

In the second embodiment, the shafts 120 and the protrusions 122 are formed on the panel cover 114, while the shaft receiving holes 124 and the dimples 126 are formed in the side walls of the recess 110. However, the shaft receiving holes 124 and the dimples 126 may be formed in the panel cover 114, with the shafts 120 and the protrusions 122 formed in the side walls of the recess 110.

The number of the protrusions 122 has been described to be plural, but it may be one.

In the above-described second embodiment, the first and second clamping members 140a and 140b are fastened together by threaded bolts, but they may be fastened by a securing member having hooks formed at opposite ends thereof, and placing the hooks into engagement with holes formed in the first and second clamping members 108a and 108b.

In some cases, the side flaps 152c and 152d may be eliminated.

The protrusions 160 and 164 may be formed in the front and rear sections 104 and 106, respectively, instead of the intermediate sections 108, with the mating recesses formed in the intermediate sections 108.

The intermediate section 108 has been described to be formed of the right and left parts 108a and 108b, but it may be a single rectangular hollow member having open front and rear portions.

What is claimed is:

1. A power supply apparatus comprising:
   a case;
   a control panel disposed on a part of said case, including a plurality of controllers; and
   a cover adapted to be placed over said control panel, at least part of each of lateral sides of said cover, when in its closed position where said cover is over said panel, substantially contacting said ease, said cover being mounted to said case in such a manner as to be rotatable about a rotation axis extending substantially perpendicular to said lateral sides at locations where said lateral sides of said cover contact said case;
   at least one of said controllers having a controller operating tip portion;
   said cover having an opening therein through which said controller operating tip portion is adapted to protrude beyond said cover when said cover is placed over said panel, said opening being arranged in such a manner that said cover can rotate about said rotation axis to uncover said panel without being interfered by said controller operating tip portion.

2. The power supply apparatus according to claim 1 wherein said power supply apparatus can operate selectively in a plurality of operating modes, and a controller for setting parameters in respective ones of said operating modes is said at least one controller.

3. The power supply apparatus according to claim 1 wherein said at least one controller, when pressed, is placed in a parameter setting mode; and a parameter is set by rotating or sliding said at least one controller.

4. A power supply apparatus comprising:
   a case;
   a control panel disposed on a part of said case, including a plurality of controllers for setting characteristics of power supply circuitry;
   a cover adapted to be placed over said control panel, at least part of each of lateral sides of said cover, when in its closed position where said cover is over said panel, substantially contacting said case, said cover being mounted to said case in such a manner as to be rotatable about a rotation axis extending substantially perpendicular to said lateral sides at locations where said lateral sides of said over contact said case;
   at least one protrusion formed in one of said case and each of said lateral sides of said cover, said at least one protrusion being located on a circumference of a circle centered about said rotation axis; and
   a plurality of dimples formed in the other of said case and each of said lateral sides, said dimples being adapted to receive said at least one protrusion;
   said dimples being formed in such locations that said at least one protrusion can be received in one of said plurality of dimples when said cover is in the closed position, and can be received in successive ones of said dimples as said cover is rotated about said rotation axis to uncover said panel.

5. The power supply apparatus according to claim 4 further comprising:

a cable led into said case from the outside of said case through an opening formed in said case;

a first clamping member formed integral with said case and surrounding approximately one-half of the circumference of said cable; and a second clamping member secured to said first clamping member in such a manner as to surround the remaining part of the circumference of said cable, whereby the entire circumference of said cable can be surrounded by said first and second clamping members.

6. The power supply apparatus according to claim 4 wherein said case includes front and rear sections disposed to face each other with a spacing disposed therebetween, and an intermediate section disposed between said front and rear sections, said intermediate section contacting said front and rear sections so as to interconnect said front and rear sections;

said power supply apparatus further comprising:

a sheet disposed within said intermediate section in such a manner as to cover components of said power supply circuitry;

said sheet having a first flap extending from a top portion of said sheet, passing beneath an abutment between said front and intermediate section, and extending into said front section, and second flap extending from a top portion of said sheet, passing beneath an abutment between said rear and intermediate section, and extending into said rear section.

7. The power supply apparatus according to claim 4 wherein said case includes front and rear sections disposed to face each other with a spacing disposed therebetween, and an intermediate section disposed between said front and rear sections, said intermediate section having end surfaces contacting end surfaces of said front and rear sections so as to couple said front and rear sections;

said power supply apparatus further comprising:

a first protrusion formed in one of the rear end surface of said front section and the front end surface of said intermediate sections abutting each other, said first protrusion extending toward the other of said abutting end surfaces;

a first recess formed in said other end surface and receptive of said first protrusion;

a second protrusion formed in one of the front end surface of said rear section and the front end surface of said intermediate sections abutting each other, said second protrusion extending toward the other of said abutting front and rear end surfaces of said rear and intermediate sections;

a second recess formed in said other abutting end surface and receptive of said second protrusion.

* * * * *